(12) United States Patent
Zha et al.

(10) Patent No.: US 12,271,997 B2
(45) Date of Patent: Apr. 8, 2025

(54) MULTI-SPECIALTY VR SCENE VERIFICATION METHOD ORIENTED TO SMART SUBWAY

(71) Applicant: CASCO SIGNAL LTD., Shanghai (CN)

(72) Inventors: Wei Zha, Shanghai (CN); Dong Gao, Shanghai (CN); Xiaoyong Wang, Shanghai (CN); Xiaoque Ling, Shanghai (CN); Haigang Cui, Shanghai (CN); Yuesheng Du, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 0 days.

(21) Appl. No.: 18/003,497

(22) PCT Filed: Sep. 22, 2021

(86) PCT No.: PCT/CN2021/119529
§ 371 (c)(1),
(2) Date: Dec. 27, 2022

(87) PCT Pub. No.: WO2023/272965
PCT Pub. Date: Jan. 5, 2023

(65) Prior Publication Data
US 2023/0377253 A1 Nov. 23, 2023

(30) Foreign Application Priority Data
Jun. 28, 2021 (CN) .......................... 202110717398.0

(51) Int. Cl.
*G06T 17/00* (2006.01)
*G06T 13/40* (2011.01)
*G09B 9/04* (2006.01)

(52) U.S. Cl.
CPC .............. *G06T 17/00* (2013.01); *G06T 13/40* (2013.01); *G09B 9/04* (2013.01)

(58) Field of Classification Search
CPC ................................ G06T 17/00; G06T 13/40
See application file for complete search history.

(56) References Cited

U.S. PATENT DOCUMENTS

2019/0265703 A1* 8/2019 Hicok .................... G05D 1/617

FOREIGN PATENT DOCUMENTS

| CN | 110299046 A | 10/2019 |
|---|---|---|
| CN | 111276015 A | 6/2020 |

(Continued)

*Primary Examiner* — Matthew Salvucci
(74) *Attorney, Agent, or Firm* — HSML P. C.

(57) ABSTRACT

The present invention relates to a multi-specialty VR scene verification system oriented to a smart subway. The system includes a cloud server, an intelligent dispatching subsystem TIDAS, and a VR subsystem. The VR subsystem includes a VR workstation and a VR device. The VR workstation is respectively connected to the cloud server, the intelligent dispatching subsystem TIDAS and the VR device, and the VR workstation is provided with an on-board controller simulation subsystem, a 3D animation simulation subsystem, and an integrated supervisory control subsystem ISCS. The VR workstation is configured to restore signals and an integrated supervisory control device of a real line according to an actual line and to perform VR virtual scene demonstration. The VR device is configured to operate a device in the VR virtual scene so as to achieve the manual system intervention, fault injection and verification of an output of the system. Compared with the prior art, the present invention has the advantages of high integration, high system consistency, multi-system deep fusion, and the like.

8 Claims, 3 Drawing Sheets

(56) References Cited

FOREIGN PATENT DOCUMENTS

| | | | |
|---|---|---|---|
| CN | 111413892 A | | 7/2020 |
| CN | 212060893 U | | 12/2020 |
| CN | 112684715 A | * | 4/2021 |
| KR | 20080088292 A | | 10/2008 |

* cited by examiner

MULTI-SPECIALTY VR SCENE VERIFICATION METHOD ORIENTED TO SMART SUBWAY

FIELD OF TECHNOLOGY

The present invention relates to a rail transit signal system, and in particular relates to a multi-specialty VR (Virtual Reality) scene verification system oriented to a smart subway.

BACKGROUND

With the breakthrough development of rail transit signal technology in recent years, the subway industry has become more and more stringent on the degree of automation, safety level, operation efficiency, operating cost and delivery cycle of the signal system, which has become the future direction of urban rail transit development. To meet these requirements, a set of subway signal control system with high degree of automation, high safety level, high operation efficiency, low operating cost and short delivery cycle needs to be provided.

In the field of rail transit signals, the owner has a strong demand for signal linkage demonstration and training. From the bidding documents of different subway users, it is obvious that the owners have requirements for simulation training scenarios such as signal system operation demonstration, device cognition, status check and fault injection. However, the maintenance training devices provided in the subway training center are all physical objects such as cabinets, driver's console, signals, switch machines, beacons, axle counters, etc., which can only play a cognitive training role, but cannot make the trainees understand the function and operating principle of a certain signal object in an overall large scale signal system, and is even less able to achieve the signal linkage on-line device fault simulation and the influence of the simulated fault on the whole signal system.

The traditional signal test verification system only stays at the single specialty level and has not achieved multi-specialty integrated and fused linkage verification test, while the operation level of nowadays subway control system is getting higher and higher, such as CBTC (Communication based train control) based fully automatic operation system, vehicle-vehicle communication system, etc., which has high requirements on system integration and overall system consistency. Multiple systems need to be deeply fused, corresponding rules and methods need to be formulated simultaneously, and multi-specialty integrated linkage functions are also highly required. Therefore, higher requirements are put forward for the test verification environment. In addition, the low expandability, high device cost, low restoration degree for the real operation environment, and under-developed training supporting device for the field staffs in the traditional test system pose a threat to the long-term reliable operation of the signal system in the later period.

Therefore, how to fuse multiple specialties to overcome the defects of single-specialty operation of the traditional test verification system and to restore the real operation scene has become the technical problem needing to be solved.

SUMMARY

An objective of the present invention is to provide a multi-specialty VR scene verification system oriented to a smart subway in order to overcome the defects in the prior art.

The objective of the present invention may be achieved through the following technical solution:

In accordance with one aspect of the present invention, a multi-specialty VR scene verification system oriented to a smart subway is provided. The system includes a cloud server, an intelligent dispatching subsystem TIDAS (Traffic Integrated Dispatcher Automatic System), and a VR subsystem. The VR subsystem comprises a VR workstation and a VR device, the VR workstation is respectively connected to the cloud server, the intelligent dispatching subsystem TIDAS and the VR device. The VR workstation is provided with an on-board controller simulation subsystem, a 3D animation simulation subsystem, and an integrated supervisory control subsystem ISCS.

The VR workstation is configured to model according to an actual line so as to restore signals and an integrated supervisory control device of a real line, and to perform VR virtual scene demonstration; and the VR device is configured to operate a device in the VR virtual scene so as to achieve the manual system intervention, fault injection and verification of an output of the system.

As a preferred technical solution, the VR virtual scene comprises multi-specialty typical signal devices.

As a preferred technical solution, the multi-specialty typical signal devices comprise a vehicle, a platform door, a PIS (Passenger Information System) device, a PA device, a signal, a beacon, a pantograph, an automatic fare collection system, a platform emergency stop button, a platform region closure button, a dispatching telephone, an emergency intercom, an on-board emergency handle, and a driver's console.

As a preferred technical solution, the multi-specialty typical signal devices may be manually intervened by the VR device so as to achieve large scale system linkage.

As a preferred technical solution, the VR virtual scene demonstration comprises a VR vehicle triggering process, a VR scene display process, and a VR integrated supervisory control triggering process.

As a preferred technical solution, the VR vehicle triggering process is specifically as follows:

Triggering a device in a train, transmitting, by the VR work station, a corresponding triggering message to FEP-Server middleware by UDP (user datagram protocol), and transmitting, by the FEPServer, the message to the on-board controller simulation subsystem by the UDP to achieve linkage response of a signal system.

As a preferred technical solution, the triggering the device in the train comprises: pressing a button on the driver's console, pushing a driver controller on the driver's console, opening a cover plate of the driver's console, opening an emergency detrainment door, pressing the emergency intercom, and triggering the emergency handle and door anti-pinch protection.

As a preferred technical solution, the VR scene display process is specifically as follows:

displaying an operation status of the signal system in a visualized status in a VR environment, comprising the operation of the train, the opening/closing of the platform gate, and broadcasting.

As a preferred technical solution, the VR integrated supervisory control triggering process is specifically as follows:

triggering an integrated supervisory control device, and simulating a passenger sudden emergency, a pantograph fault, a platform fire hazard, a tunnel flood disaster, a vehicle fire hazard, a tunnel fire hazard, and a big passenger flow scene.

As a preferred technical solution, a plurality of scenes are preset in the VR virtual scene for a tester or trainee to test and learn.

Compared with the prior art, the present invention has the following advantages:

1. High multi-specialty fusion and integration: according to the present invention, multiple specialties are integrated and fused to overcome the shortcomings of single-specialty operation of a traditional test verification system. The system provided by the present invention has the advantages of high integration, high system consistency, deep integration of multiple systems and the like. Moreover, the system is independent of the outfield test line, and can perform the verification of interface test, system function and performance test among the various specialties of the fully automatic operation system, and can highly restore the real operation scene by using the VR virtual technology.
2. Cost and time saving: Most of the traditional system data tests are done on the main line, which greatly reduces the problem detection rate and increases the potential accidents. If an additional device the same as the main line is purchased for the test center to satisfy the test, the cost and time are greatly increased, and the reusability of the device is low. While the application of the verification system provided by the present invention can greatly save the cost, time and space occupation of the device.
3. Powerful function and strong expandability: Compared with the traditional system, the whole subway system in the present invention is virtualized to highly restore the main line in the control logic and method, which is extremely convenient for the verification and testing of function scenarios of the subway signal system and can complete the upgrade verification of unmanned function without adding any device.
4. Strong universality: When testing different systems, the traditional test verification method and apparatus usually need to replace device and a good deal of development work, which affects the efficiency of verification and testing. The functions of corresponding projects can be verified and tested according to the data configurations of different projects.
5. Complete multi-specialty integrated linkage training function: Part of the theoretical and practical training for the traditional subway line staff is completed in the training center, while the rest is completed on the main line; moreover, the theoretical training and practical training in the training center are also conducted separately, and there is no training on the functional linkage of this subway line, so it is more difficult for the students to understand and operate. In accordance with the present invention, the theory is combined with the practical operation to highly restore the real scenario and provide assistance for the learning of the staff.
6. Strong interaction capacity: According to the present invention, both manual system intervention and fault injection may be achieved, the linkage response phenomena may be focused, the process flow of test verification is simplified, and the correctness of the output of the verification result is also enhanced.

DESCRIPTION OF THE EMBODIMENTS

The technical solutions of the embodiments of the present invention are clearly described below with reference to the accompanying drawings in the present invention. Apparently, the described embodiments are some rather than all of the embodiments of the present invention. On the basis of the embodiment of the present invention, all other embodiments obtained by the person of ordinary skill in the art without involving any inventive effort should fall within the scope of protection of the present invention.

Figure 1:
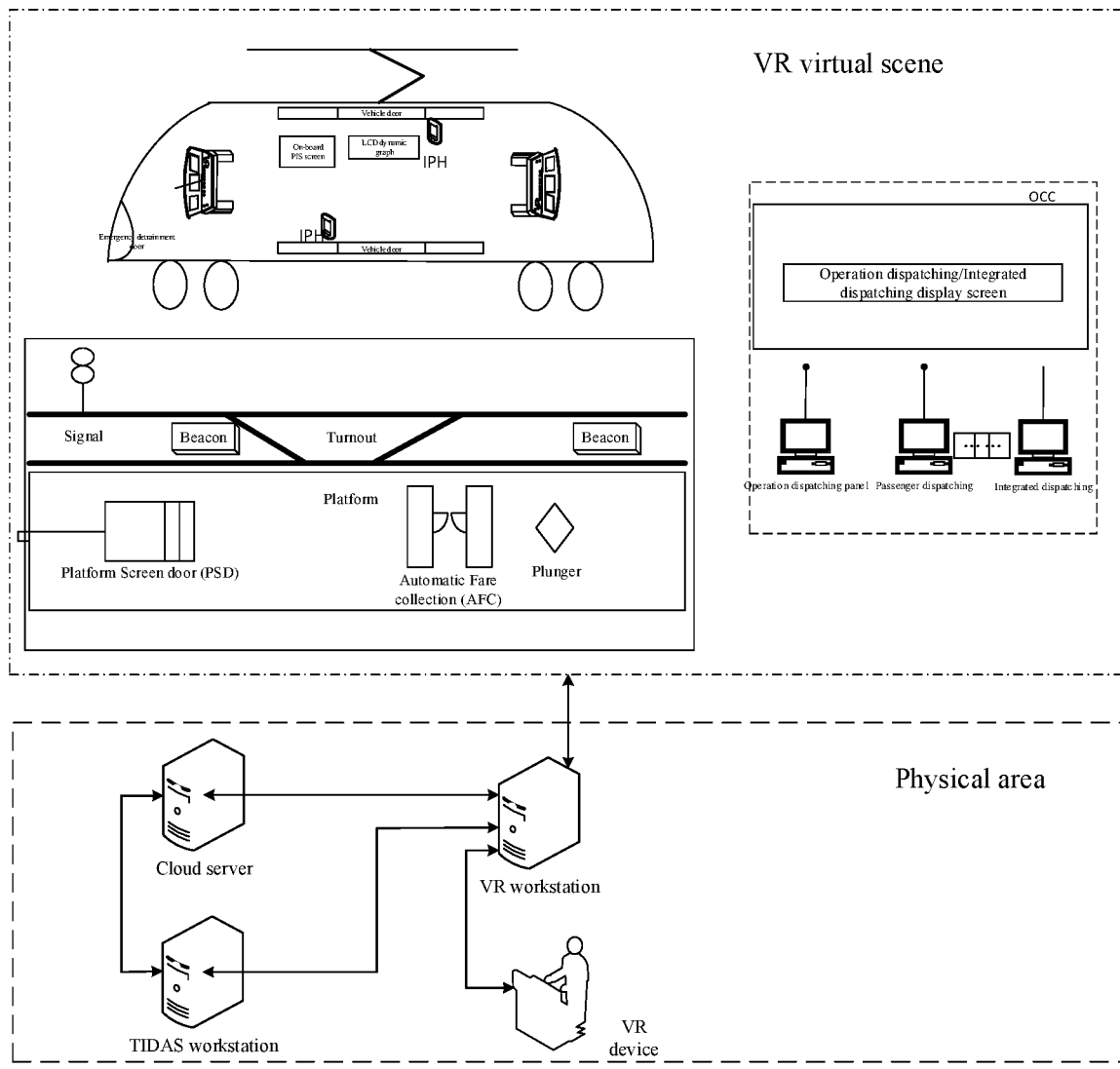
FIG. 1 is a structure diagram of a system in accordance with the present invention.

As shown in FIG. 1, a multi-specialty VR scene verification system oriented to a smart subway provided by the present invention includes a cloud server, an intelligent dispatching subsystem TIDAS, and a VR subsystem. The VR subsystem comprises a VR workstation and a VR device, the VR workstation is respectively connected to the cloud server, the intelligent dispatching subsystem TIDAS and the VR device, and the VR workstation is provided with an on-board controller simulation subsystem, a 3D animation simulation subsystem, and an integrated supervisory control subsystem ISCS.

the VR workstation is configured to model according to an actual line so as to restore signals and an integrated supervisory control device of a real line 1:1, and to perform VR virtual scene demonstration; and the VR device is configured to operate a device in the VR virtual scene so as to achieve the manual system intervention, fault injection and verification of an output of the system.

The multi-specialty typical signal devices include a vehicle, a platform door, a PIS device, a PA device, a signal, a beacon, a pantograph, an automatic fare collection system, a platform emergency stop button, a platform region closure button, a dispatching telephone, an emergency intercom, an on-board emergency handle, and a driver's console.

The multi-specialty typical signal devices may be manually intervened by the VR device so as to achieve large scale system linkage.

Figure 2:
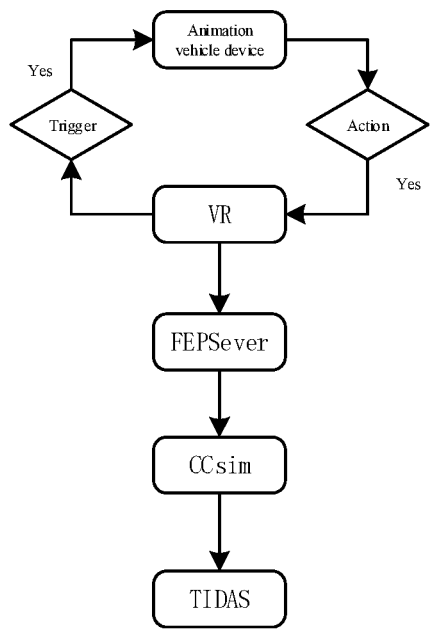
FIG. 2 is a flowchart of VR vehicle triggering in accordance with the present invention.
Figure 3:
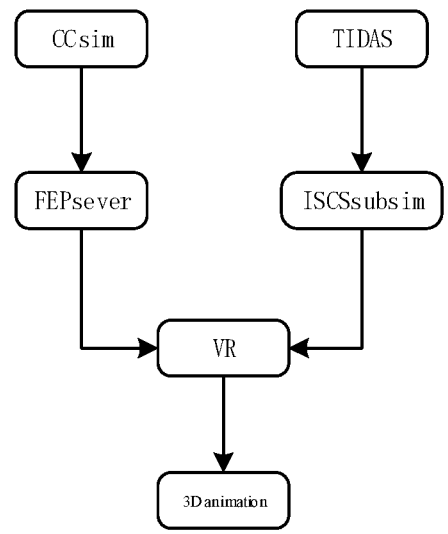
FIG. 3 is a flowchart of VR scene presentation in accordance with the present invention.
Figure 4:
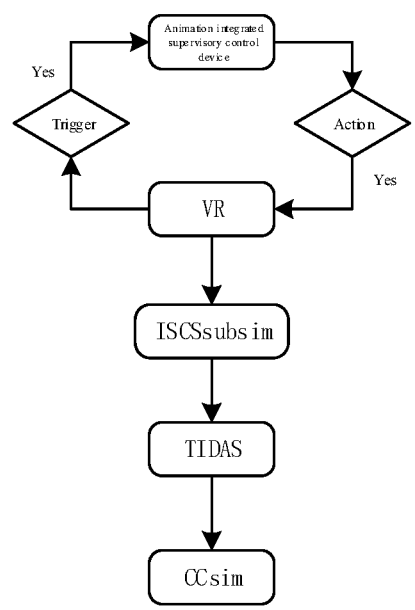
FIG. 4 is a flowchart of VR integrated supervisory control triggering in accordance with the present invention.

As shown in FIGS. 2-4, the VR virtual scene demonstration includes a VR vehicle triggering process, a VR scene display process, and a VR integrated supervisory control process.

As shown in FIG. 2, the VR vehicle triggering includes: triggering a device in a train by a tester, such as, pressing a button on the driver's console, pushing a driver controller on the driver's console, opening a cover plate of the driver's console, opening an emergency detrainment door, pressing the emergency intercom, and triggering the emergency handle and door anti-pinch protection. The train device is triggered, the VR software is configured to transmit a corresponding triggering message to FEPServer middleware via a UDP, and then the message is transmitted by FEPSever to simulated on-board software via the UDP so as to achieve the linkage response of a signal system.

As shown in FIG. 3, the VR scene display includes: displaying an operation status of the signal system in a visualized status in a VR environment, such as the operation of the train, the opening/closing of the platform gate, broadcasting, and other scenes.

As shown in FIG. 4, the VR integrated supervisory monitoring includes: triggering, by the tester, an integrated supervisory control device, and simulating a passenger sudden emergency, a pantograph fault, a platform fire hazard, a tunnel flood disaster, a vehicle fire hazard, a tunnel fire hazard, big passenger flow, and other scenes.

A plurality of scenes may be preset in the VR virtual scene for a tester or trainee to test and learn. Several typical scenes are listed below:

Scene 1: After wearing the VR glasses and holding a laser sensing handle with a hand, a user may look around the whole dispatching hall in the VR animation, scheduled faults and alarms, such as a station fire hazard, water intrusion, tripping and other alarms, may pop up in the VR animation, including: operation dispatching, power dispatching and environment control dispatching, etc. The user selects a certain station and enters to an alarm area by aligning the handle laser with the big dispatching screen within the VR animation, and if a certain station suffers from the fire hazard, the VR animation may be switched to the fire scene.

When an alarm button is clicked using the VR laser handle in the animation, the central dispatching screen cuts in the VR camera screen immediately to prompt the operating user to pick up the phone with the VR handle.

After the phone is picked up, the user may use the VR handle from the VR central dispatching screen to enter the picture in picture video surveillance within the VR animation so as to check out the site condition.

After checking out the video surveillance, the user may switch back to the central dispatching hall for decision-making and handling. The specific handling method may refer to the user requirements for integrated supervisory control, all the requirements for handling operations can be done in the VR animation for operation.

Scene 2: In the compartment VR animation, the user may clearly see the red emergency handle next to the door, and the VR animation gives a hint that this fault can be triggered. The door emergency handle may be pulled using the laser handle in the VR animation, when triggered, the signal system immediately performs EB stop, and the VR animation prompts the user to view in a signal integrated dispatching interface. This train stop is displayed on a signal operation dispatching interface (Automatic Train Supervision ATS), and the alarm of this train appears on an integrated supervisory control interface, and the user may click to view specific alarm information.

Scene 3: In the VR animation, the status in the vehicle can be observed at multi-angle by wearing the VR interactive head-up display device, a visiting operator turns the head to focus the eyes on the on-board signal device (Casco iCC on-board devices for example), and may simulate the opening of the on-board cabinet door through the laser handle of VR to view the operating status of the on-board subsystems and individual board cards. Operations such as plugging and unplugging a board card, power outages, network outage, and the like may also be simulated by means of the handle.

The VR scene may be preset according to specific test verification use case functions.

The system provided by the present invention is used in Shanghai Engineering Research Center of Driverless Train Control of Urban Guided Transport and High Dependable Intelligent Urban Rail Engineering Research Center to verify subway systems such as Shanghai line 10, Shenzhen line 20, Zhengzhou line 5, etc., thereby guaranteeing the release quality of the above subway line signaling systems, significantly improving test efficiency, and effectively reducing test device costs. The present invention system is a development direction of the test verification platform.

The foregoing descriptions are merely specific implementations of the present invention, but are not intended to limit the scope of protection of the present invention. Any equivalent modification or replacement readily figured out by a person of ordinary skill in the art within the technical scope disclosed in the present invention shall fall within the scope of protection of the present invention. Therefore, the scope of protection of the present invention shall be subject to the scope of protection of the claims.

The invention claimed is:

1. A multi-specialty virtual-reality (VR) scene verification system oriented to a smart subway, comprising a cloud server, an intelligent dispatching subsystem traffic-integrated-dispatcher-automatic-system (TIDAS), and a VR subsystem, wherein the VR subsystem comprises a VR workstation and a VR device, the VR workstation is respectively connected to the cloud server, the intelligent dispatching subsystem TIDAS and the VR device, and the VR workstation is provided with an on-board controller simulation subsystem, a three-dimensional (3D) animation simulation subsystem, and an integrated supervisory control subsystem (ISCS);

the VR workstation is configured to model according to an actual line so as to restore signals and an integrated supervisory control device of a real line, and to perform VR virtual scene demonstration; and the VR device is configured to operate a device in the VR virtual scene so as to achieve the manual system intervention, fault injection and verification of an output of the system, wherein the VR virtual scene comprises multi-specialty typical signal devices, wherein the multi-specialty typical signal devices comprise a vehicle, a platform door, a passenger-information-system (PIS) device, a public-address (PA) device, a signal, a beacon, a pantograph, an automatic fare collection system, a platform emergency stop button, a platform region closure button, a dispatching telephone, an emergency intercom, an on-board emergency handle, and a driver's console.

2. The multi-specialty VR scene verification system oriented to the smart subway according to claim 1, wherein the multi-specialty typical signal devices can be manually intervened by the VR device so as to achieve large scale system linkage.

3. The multi-specialty VR scene verification system oriented to the smart subway according to claim 1, wherein the VR virtual scene demonstration comprises a VR vehicle triggering process, a VR scene display process, and a VR integrated supervisory control triggering process.

4. The multi-specialty VR scene verification system oriented to the smart subway according to claim 3, wherein the VR scene display process is specifically as follows:

displaying an operation status of the signal system in a visualized status in a VR environment, comprising the operation of the train, the opening/closing of the platform gate, and broadcasting.

5. The multi-specialty VR scene verification system oriented to the smart subway according to claim 1, wherein a plurality of scenes are preset in the VR virtual scene for a tester or trainee to test and learn.

6. A multi-specialty virtual-reality (VR) scene verification system oriented to a smart subway, comprising a cloud server, an intelligent dispatching subsystem traffic-integrated-dispatcher-automatic-system (TIDAS), and a VR subsystem, wherein the VR subsystem comprises a VR workstation and a VR device, the VR workstation is respectively connected to the cloud server, the intelligent dispatching subsystem TIDAS and the VR device, and the VR workstation is provided with an on-board controller simulation subsystem, a three-dimensional (3D) animation simulation subsystem, and an integrated supervisory control subsystem (ISCS);

the VR workstation is configured to model according to an actual line so as to restore signals and an integrated supervisory control device of a real line, and to perform VR virtual scene demonstration; and the VR device is configured to operate a device in the VR virtual scene so as to achieve the manual system intervention, fault injection and verification of an output of the system, wherein the VR virtual scene demonstration comprises a VR vehicle triggering process, a VR scene display process, and a VR integrated supervisory control triggering process, wherein the VR vehicle triggering process is specifically as follows:

triggering a device in a train, transmitting, by the VR work station, a corresponding triggering message to front-end-processor-server (FEPServer) middleware by user datagram protocol (UDP), and transmitting, by the FEPServer, the message to the on-board controller simulation subsystem by the UDP to achieve linkage response of a signal system.

7. The multi-specialty VR scene verification system oriented to the smart subway according to claim 6, wherein the triggering the device in the train comprises: pressing a button on the driver's console, pushing a driver controller on the driver's console, opening a cover plate of the driver's console, opening an emergency detrainment door, pressing the emergency intercom, and triggering the emergency handle and door anti-pinch protection.

8. A multi-specialty virtual-reality (VR) scene verification system oriented to a smart subway, comprising a cloud server, an intelligent dispatching subsystem traffic-integrated-dispatcher-automatic-system (TIDAS), and a VR subsystem, wherein the VR subsystem comprises a VR workstation and a VR device, the VR workstation is respectively connected to the cloud server, the intelligent dispatching subsystem TIDAS and the VR device, and the VR workstation is provided with an on-board controller simulation subsystem, a three-dimensional (3D) animation simulation subsystem, and an integrated supervisory control subsystem (ISCS);

the VR workstation is configured to model according to an actual line so as to restore signals and an integrated supervisory control device of a real line, and to perform VR virtual scene demonstration; and the VR device is configured to operate a device in the VR virtual scene so as to achieve the manual system intervention, fault injection and verification of an output of the system, wherein the VR virtual scene demonstration comprises a VR vehicle triggering process, a VR scene display process, and a VR integrated supervisory control triggering process, wherein the VR integrated supervisory control triggering process is specifically as follows:

triggering an integrated supervisory control device, and simulating a passenger sudden emergency, a pantograph fault, a platform fire hazard, a tunnel flood disaster, a vehicle fire hazard, a tunnel fire hazard, and a big passenger flow scene.

\* \* \* \* \*